United States Patent
Zafarana et al.

(10) Patent No.: US 6,346,801 B1
(45) Date of Patent: Feb. 12, 2002

(54) METHOD AND AN ASSOCIATED DEVICE FOR CONTROLLING A DC-DC CONVERTER BASED UPON AN ITERATIVE PROCEDURE

(75) Inventors: Alessandro Zafarana; Simone Christian Bassani, both of Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/664,926

(22) Filed: Sep. 19, 2000

(30) Foreign Application Priority Data

Sep. 21, 1999 (EP) .......................... 99830592
Dec. 28, 1999 (EP) .......................... 99204573

(51) Int. Cl.[7] ................................ G05F 1/44
(52) U.S. Cl. ................................ 323/284; 323/224
(58) Field of Search ................ 323/283, 284, 323/285, 286, 287, 224, 901

(56) References Cited

U.S. PATENT DOCUMENTS

| | | | |
|---|---|---|---|
| 5,568,044 A | 10/1996 | Bittner | 323/272 |
| 5,801,518 A | 9/1998 | Ozaki et al. | 323/222 |
| 5,808,455 A * | 9/1998 | Schwartz et al. | 323/271 |
| 5,945,820 A | 8/1999 | Namgoong et al. | 323/282 |

OTHER PUBLICATIONS

MIC2178 2.5A Synchronous Buck Regulator Micrel, Inc. Datasheet, Online! Jun. 1998, XP002130725 San Jose, CA, U.S.A. pp. 1–16.

MIC2179 1.5A Synchronous Buck Regulator Micrel, Inc. Datasheet, Online! Jun. 1998, XP002130726 San Jose, CA U.S.A. pp. 1–16.

MIC2177 2.5A Synchronous Buck Micrel, Inc. Datasheet, Online! Apr. 1999, XP002130724 San Jose, CA. U.S.A. pp. 1–16.

* cited by examiner

*Primary Examiner*—Shawn Riley
(74) *Attorney, Agent, or Firm*—Lisa K. Jorgenson; Allen, Dyer, Doppelt, Milbrath & Gilchrist, P.A.

(57) ABSTRACT

A method and system for controlling a DC-DC converter compares the output voltage with a low threshold and a high threshold, and injects a certain minimum electric charge into an inductor of the converter during a charge period corresponding to a power switch. The beginning of a charge period is commanded each time the output voltage drops below the low threshold, and the electric charge transferred during a charge period is progressively increased until the output voltage rises to the high threshold. The output voltage starts from the low threshold upon executing the charge period. The duration of the time interval between two consecutive charge periods is measured and stored. The current time interval is compared with the previously detected and stored time interval. The output voltage is decreasing to the minimum electric charge whenever an increment of the time interval between two consecutive charge periods is detected.

33 Claims, 9 Drawing Sheets

METHOD AND AN ASSOCIATED DEVICE
FOR CONTROLLING A DC-DC CONVERTER
BASED UPON AN ITERATIVE PROCEDURE

FIELD OF THE INVENTION

The present invention relates to electronics, and, more particularly, to a DC-DC converter that addresses the problem of voltage regulation on a variable load.

BACKGROUND OF THE INVENTION

Voltage regulation circuits typically provide a certain voltage that is maintained constant by feeding back the output. In a pulse width modulation (PWM) switching regulator, a square wave drives the control terminal of a switch determining its conduction or cut-off state. By increasing the time interval of conduction of the switch, the output voltage increases. The opposite occurs by increasing the time interval of the cut-off. The output voltage is thus controlled by varying the duty cycle of the square wave driving signal. Such a control of the duty cycle is performed by a circuit which continuously compares the output voltage with a reference voltage, and adjusts the duty cycle of the square wave to keep constant the output voltage.

When the switch is a MOS transistor, a non-negligible power is required to charge periodically the gates of the switching transistors. The switching power loss increases as the switching frequency increases. This negatively effects the converter efficiency. Alternatively, the requirement of limiting the variations of the voltage applied to the load within a tolerable range does not permit reduction of the switching frequency as much as desired.

To maximize the conversion efficiency of a switching regulator, several manufactures implement a pulse frequency modulation (PFM) technique, or a skip mode. This technique controls the peak value of the current flowing in the inductor while operating in a discontinuous mode.

In the commercial device MIC 2177/8/9 provided by Micrel Inc., a control with constant current peaks is formed as long as the load remains relatively low. For high loads, the control reverts to a traditional PWM control at a fixed switching frequency. This technique does not maximize efficiency because it does not minimize the switching power losses and the power losses in the driver steps of the power MOS transistor that are predominant under low load conditions.

An approach for reducing the switching power losses is disclosed in U.S. Pat. No. 5,568,044, which is assigned to Micrel Inc. A controller for a DC-DC converter is disclosed for implementing the two different control techniques, i.e., the pulse width modulation or the pulse frequency modulation. The one with the lowest power dissipation upon a change of load conditions is used.

SUMMARY OF THE INVENTION

In view of the foregoing background, it is an object of the present invention to provide a method for controlling a DC-DC converter through an iterative procedure that makes the circuit operate at optimal conditions by adapting to any variation of the load. The method may be used with other known techniques for controlling a DC-DC converter, e.g., PWM and PFM.

According to another aspect of the invention, the controller, designed to adjust the switching frequency to be close as possible to the optimal frequency, minimizes switching power losses and driver losses. This maximizes the power being transferred from the supply to the load. The output voltage is preferably compared with a pre-established low threshold and a pre-established high threshold. A certain minimum electric charge to be transferred is injected into the inductor of the converter during a conduction interval or phase of a power switch.

The method includes commanding the beginning of a conduction phase charge period each time the output voltage reaches the low threshold, and progressively increases the electric charge that is transferred during each charge period until the output voltage reaches the high threshold starting from the low threshold in a charge period. The duration of the off interval of the switch is preferably monitored and stored between two consecutive charge periods. The current off interval is preferably compared with the previously stored off interval. The minimum value of the electric charge that is transferred is decreased when an increment of the off interval of the switch between two consecutive charge periods is detected.

The method of the invention may be implemented by forming a DC-DC converter using one or more power switches, and driving in a switching mode an inductor transferring electric charge from a supply node to a load of the converter. The power switches may be controlled by charge or not charge commands after executing start-up of the DC-DC converter, and by voltage regulation and efficiency boosting algorithms within a controller.

The DC-DC converter preferably further includes a pair of comparators receiving the output voltage of the converter for respectively comparing with a high threshold and a low threshold. The thresholds are established by the controller by way of digital data that is converted by a first digital/analog converter into a reference voltage that is applied to the reference inputs of the pair of comparators. Respective outputs of the pair of comparators are connected to the controller. The current through a power switch for charging the inductor is preferably monitored. The reaching of the null value of the current in the inductor is also preferably monitored.

A comparator compares either a linear voltage ramp with a certain slope or a voltage value proportional to the current charging the inductor through a power switch with a reference voltage (REF). The reference voltage corresponds to a digital value N that is produced by the controller, and is converted to a comparison voltage by a second digital/analog converter (DAC2).

BRIEF DESCRIPTION OF THE DRAWINGS

The different aspects and advantages of the invention will result be evident by the description of an embodiment of the invention and by referring to the attached drawings wherein.

DETAILED DESCRIPTION OF THE PREFERRED EMBODIMENTS

The method of the invention is based on an architecture for controlling the output voltage with maximum efficiency using inductor current detection circuits, comparators for comparing the output voltage with pre-established thresholds, circuit devices for measuring the time interval between two consecutive current pulses, and a state machine controller for managing the converter.

To attain the maximum conversion efficiency, an expression of the switching frequency as a function of the load current that minimizes the switching losses and driver losses is calculated on the basis of the parameters of the particular application. The converter circuit is thus designed by properly choosing the values of inductance, output capacity of the DC-DC converter, and amplitude of the hysteresis window within which the output voltage may vary. This is done so that the controller may be able to establish the switching frequency that minimizes power loss in case of a minimum load or a maximum load.

The regulation of the output voltage of the converter is ensured by a hysteresis window. The hysteresis window is implemented by a pair of threshold comparators. The control method of the present invention periodically provides to the load a certain quantity of electric charge which is progressively incremented by one or more current pulses that may have different durations and amplitudes.

In the following description, the provision of a certain electric charge will be indicated as a charge period. The system reaches a steady state condition within a single charge period when a charge makes the output voltage rise from the lower value to the upper value of the hysteresis window using the same current pulse combination.

A supply of electrical charge that is sufficient to bring the output voltage from below the lower threshold to above the upper threshold can be carried out according to alternative embodiments of the method of the invention. Two alternative ways of implementing such a charge period are described below.

A first way of realizing the charge period that is referred to as a peak current variation (PCV), attains the optimal frequency of operation of the converter by progressively incrementing the peak level of the current pulses delivered to the inductor. This is done until, in a substantially steady-state of operation, the output voltage rises from the lower threshold to the upper threshold of the hysteresis window of regulation upon forcing a single current pulse through the inductor of the converter.

Figure 1:
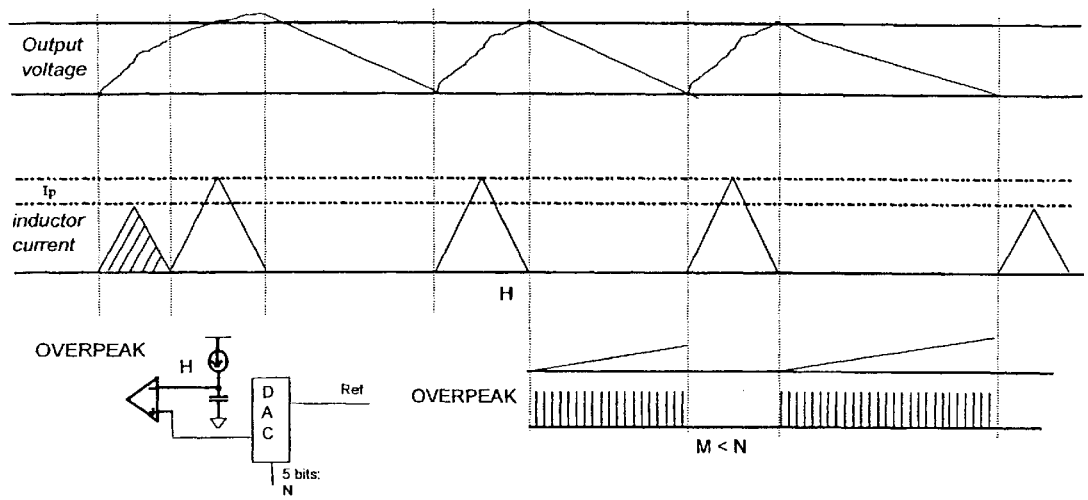
FIG. 1 illustrates the correction of output voltage changes by varying spaced current pulses having different amplitudes being forced through the inductor of the DC-DC converter in accordance with the present invention.

With reference to FIG. 1, when the output voltage reaches the lower threshold value of the hysteresis window, the control logic commands the delivery of a substantially triangular current pulse of peak value $I_P$ to the inductor (Inductor Current). If after such a first charge period the output voltage does not reach the upper threshold of the hysteresis window, one or more triangular current pulses with peak values progressively increased by a certain defined quantity $I_{step}$ will be delivered to the inductor. This is done until the output voltage (Output Voltage) reaches the upper threshold of the hysteresis window.

The system waits for the output voltage to become lower than the lower threshold of the hysteresis window. When this occurs, the system delivers a new current pulse having the same amplitude of the second pulse of the preceding series of delivered current pulses. If this new single pulse is not sufficient to make the output voltage reach the high threshold, one or more current pulses of incremented peak values will be delivered to the inductor. The above algorithm is repeated until a steady state situation is eventually attained. This follows the delivery of a single current pulse, and the output voltage rises from the lower threshold to the upper threshold of the hysteresis window of regulation.

An alternative way of forming the charge period for supplying an equivalent optimal amount of electric charge is to deliver to the load a current pulse or a combination of current pulses having different amplitudes and durations. The pulse combination provided to the load is changed until the combination making the output voltage rise from the lower threshold to the upper threshold is reached. This alternative way of forming the charge period may be referred to as a clamped frequency modulation (CFM).

Figure 6:
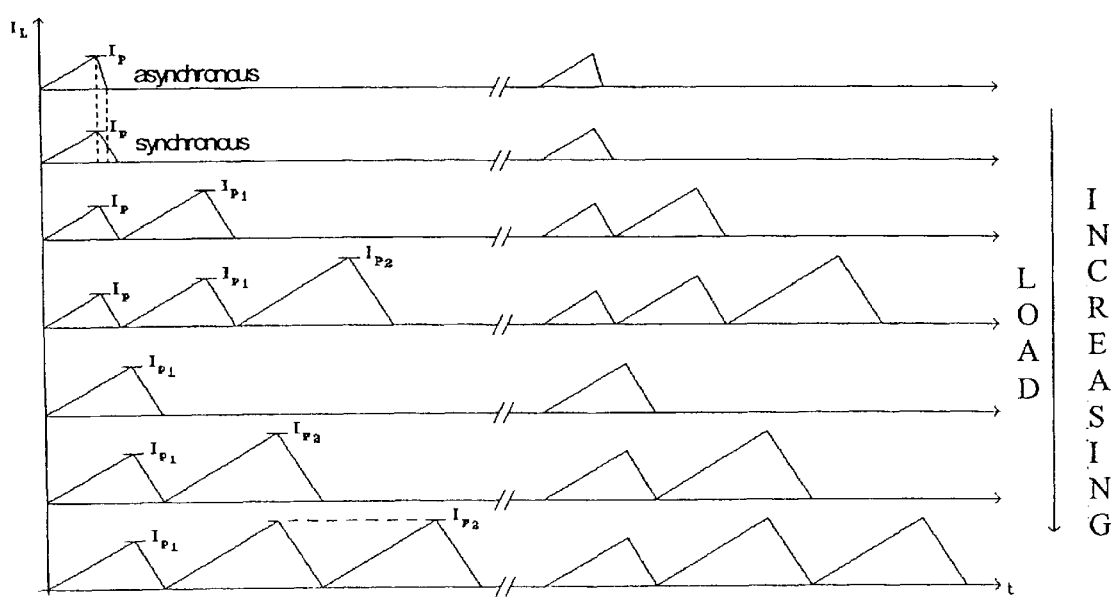
FIG. 6 shows several possible combinations of current pulses for carrying out a CFM control in accordance with the present invention.

In other words, a charge period formed in a CFM mode may include the delivery of a number of current pulses, up to a maximum of M pulses, of different amplitudes. A possible example of pulse combinations according to the CFM mode is depicted in FIG. 6. Regulation is carried out by providing initially to the load a certain minimum quantity of electric charge. If the output voltage does not reach the desired value, current pulses whose amplitude is progressively incremented $I_{p1}$, $I_{p2}$ are provided until the output voltage overcomes the upper threshold of the hysteresis window.

When the output voltage become lower than the lower threshold of the hysteresis window, a new charge period is started. This provides a current pulse having a greater amplitude $I_{p1}$. If after such a pulse it exceeds the upper threshold of the hysteresis window, the provision to the load is stopped while waiting for the output voltage to decrease below the value of the lower threshold of the hysteresis window, otherwise a current pulse of amplitude $I_{p2}$ is provided.

After having verified that pulses of amplitude $I_{p1}$ and $I_{p2}$ have been provided, the output voltage varies from the lower threshold to the upper threshold of the hysteresis window. The load will be controlled by providing during each charge period a combination of the two current pulses of amplitude $I_{p1}$ and $Ip_2$.

Figure 8:
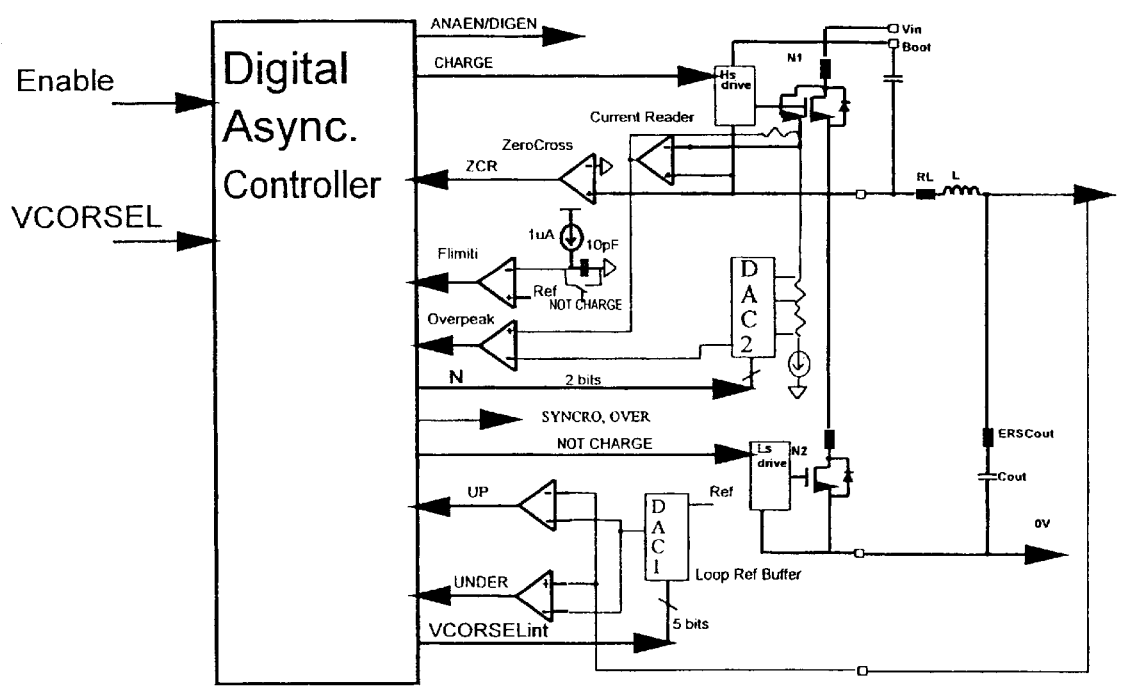
FIG. 8 is a circuit diagram of a control system for implementing the CFM version of the method in accordance with the present invention.
Figure 9:
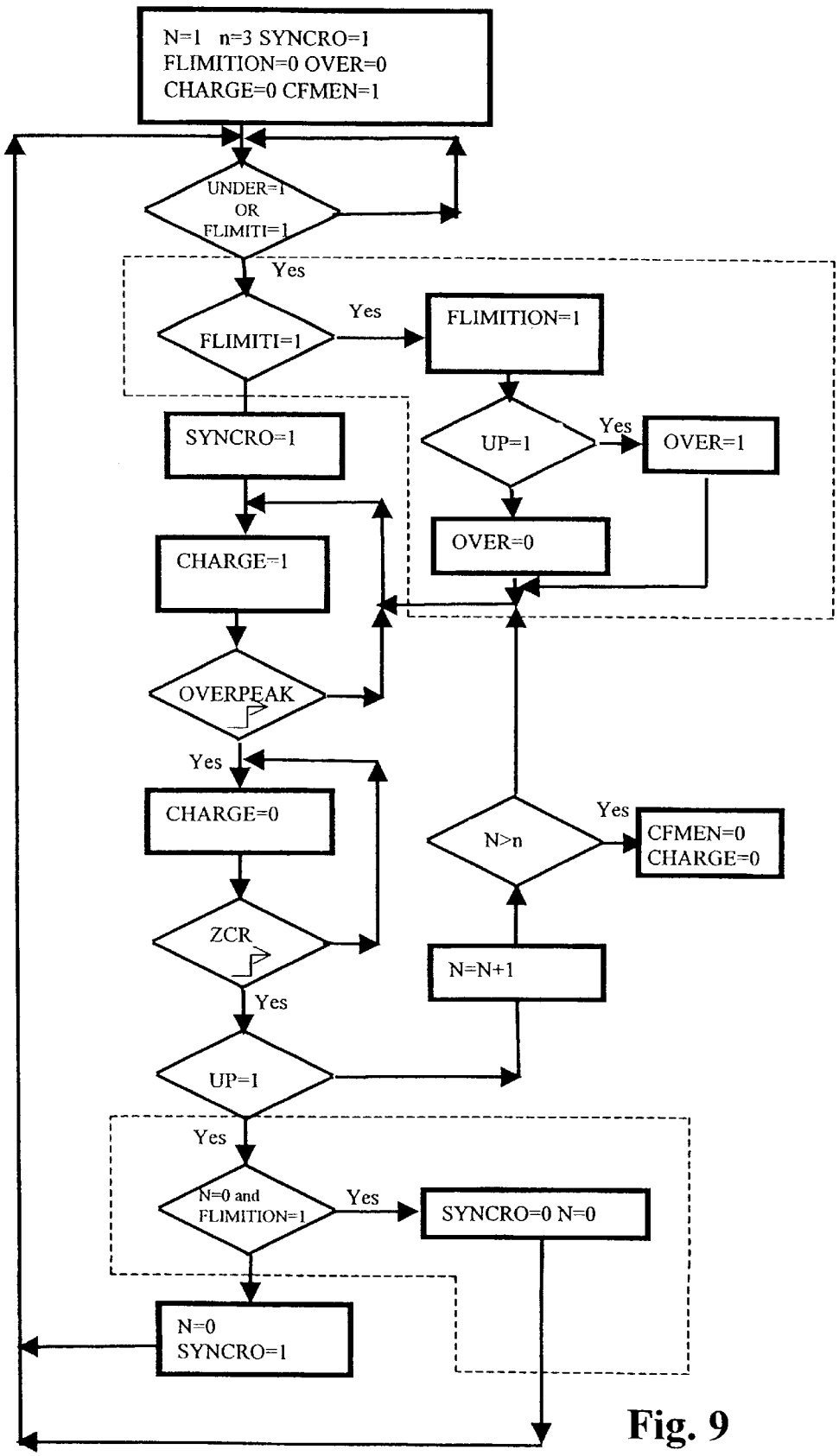
FIG. 9 is a flow chart for the CFM version of the method in accordance with the present invention.

The CFM method just described is depicted in FIG. 9, wherein dash-line contours highlight optional functions. After having run the start-up algorithm, the circuit of FIG. 8, which implements the CFM method, waits for the output to cross the lower threshold of the hysteresis window (UNDER=1) to start a new charge period.

If the upper threshold of the hysteresis window has not been reached, the variable N that regulates the amplitude of the current pulses is incremented and a new current pulse is provided to the load. This is after having carried out a check for verifying the possibility of incrementing further the amplitude of pulses (N>n). If N>n, i.e., the amplitude of pulses cannot be increased, the regulation loop is disabled in favor of a traditional control algorithm, such as a PWM driving with a certain frequency, for example. Once the upper threshold of the hysteresis window has been reached (UP=1), the system returns to provide a current pulse of a certain minimum amplitude (N=0) and a new regulation cycle starts from the beginning.

The above described procedures are repeated from the beginning at each decrease of the load that is detected by the controller in the following manner. When the output voltage reaches the upper threshold of the hysteresis window after a charge period, a device (OVERPEAK) measuring the time elapsed from the end of last pulse and the immediately following pulse is activated. Such a value of the time interval is stored and, during the following cycle, is compared with the time elapsed between the two immediately following pulses. If this last interval value is greater than the previously stored value, then the load has diminished and the procedure is repeated from the beginning.

Otherwise, if the stored value is greater than the current value, then the load has increased and one of the above described routines will adapt the converter automatically to the new operating conditions. A suitable form of implementation of a circuit for measuring time intervals may include generating a linear voltage ramp. This voltage ramp may be generated, for example, using a capacitor charged by a current generator. The voltage ramp is applied to the negative input of a voltage comparator. The positive input of the voltage comparator is coupled to the output of a digital to analog converter (DAC2) transforming a datum or digital word N corresponding to an analog voltage signal. The digital word N is provided by the controller.

Initially, N is equal to zero and establishes the lowest output voltage of the DAC2. When the analog ramp reaches this threshold set by the controller, the comparator switches from a logic low to a logic high. A counter contained in the controller increases N by detecting the switching edge. In this way, an analog voltage signal greater than the previous one is output by the DAC2, and the comparator switches from high to low. These steps are repeated each time the analog ramp reaches the analog voltage signal set by the DAC2. When the output voltage of the DC-DC converter surpasses the lower threshold of the hysteresis windows, the start-up process terminates, with the value N having been determined.

Figure 2:
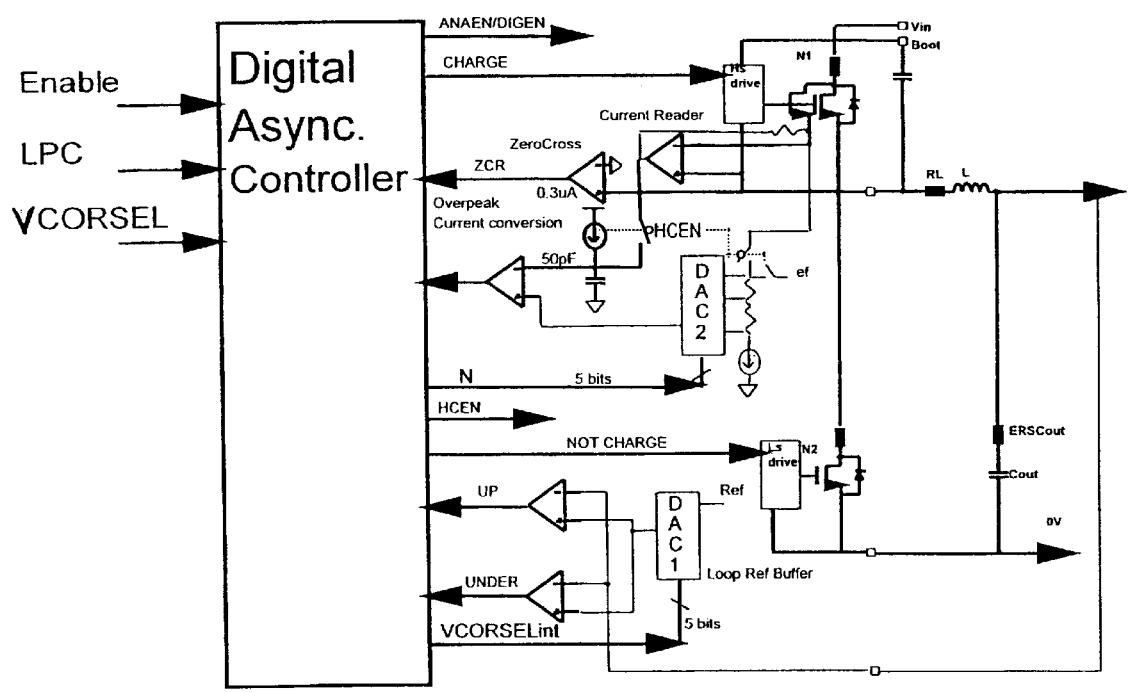
FIG. 2 is a schematic diagram of a control system based on the use of a digital state machine in accordance with the present invention.

FIG. 2 depicts a hardware embodiment of the invention as applied to a DC-DC step-down converter that is supplied by a voltage Vin. This circuit is essentially formed by an inductor L, an output capacitor Cout, and a pair of power switches. The pair of power switches respectively include an upper switch N1 and lower switch N2 formed with power MOS transistors. The circuit also includes the respective driving circuits HSDRIVE and LSDRIVE, which are enabled or disabled by the logic signals CHARGE and NOT CHARGE. A boot-strap capacitor BOOT is also included according to common practice.

The control system comprises a pair of voltage comparators for comparing the output voltage with a reference voltage produced by a first digital/analog converter (DAC1) as a function of a given digital datum VCORSELINT. The pair of voltage comparators respectively produce two logic signals UP and UNDER. A third comparator ZEROCROSS detects the zero crosses of the current in the inductor L, and generates a logic signal ZCR at each event.

The controller may be a finite or digital state digital machine DIGITAL ASYNC. CONTROLLER which preferably may be enabled or disabled by a logic command Enable. This is done to allow the control of the DC-DC converter to be made according to other conventional modes in case particular load conditions do not allow the PCV or CFM control mode of the invention, or for any other reasons.

The DIGITAL ASYNC. CONTROLLER receives as input information about the amplitude of the hysteresis window of regulation within which the output voltage is permitted to vary. The DIGITAL ASYNC. CONTROLLER produces the digital datum VCORSELINT that is fed to the DAC1. This sets the reference voltage of the UP and UNDER comparators. The current flowing through the upper switch N1 is read on a sensing resistance in series to the upper switch N1, or to a scaled replica of the power switch by an operational amplifier CURRENT READER outputting a voltage proportional to the current.

A fourth voltage comparator OVERPEAK has an input coupled to the output of a second digital/analog converter DAC2. The other input is coupled to either the output of a linear ramp voltage generator with a pre-established slope formed by a current generator and a capacitor connected in series, or to the voltage produced by the operational amplifier CURRENT READER. This is dependent on the value assumed by a control signal HCEN produced by the finite state machine.

A second digital/analog converter produces a voltage that may assume different values depending on the digital datum N produced by the DIGITAL ASYNC. CONTROLLER. The voltage values can be produced, as shown in the figure, by a voltage divider through which is forced the current produced by a current generator.

Preferably, the asynchronous finite state machine DIGITAL ASYNC. CONTROLLER implements three algorithms: a start-up routine, a regulation routine, and a low power consumption (LPC) routine.

Figure 3:
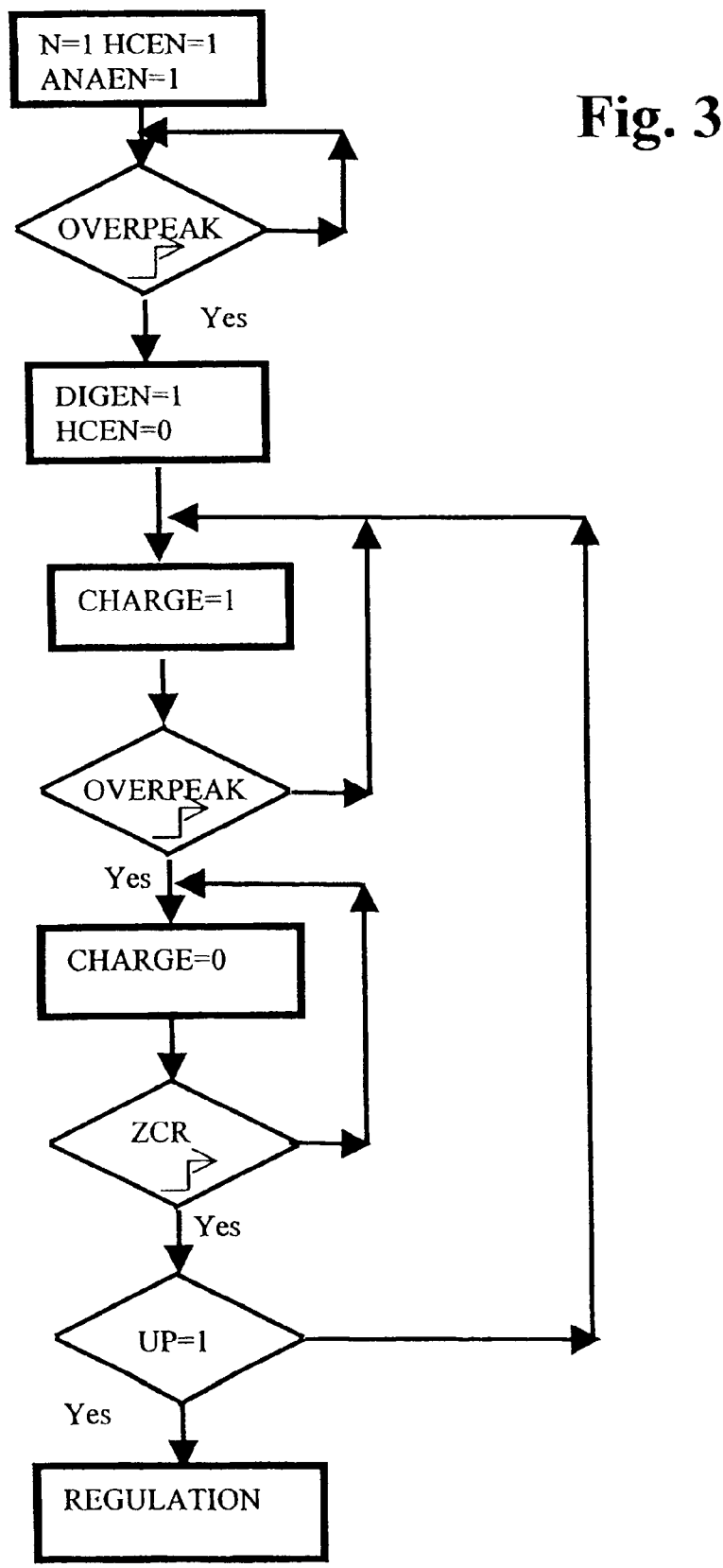
FIG. 3 is a flow chart of an algorithm executed by a digital state machine at the start-up of the system in accordance with the present invention.
Figure 7:
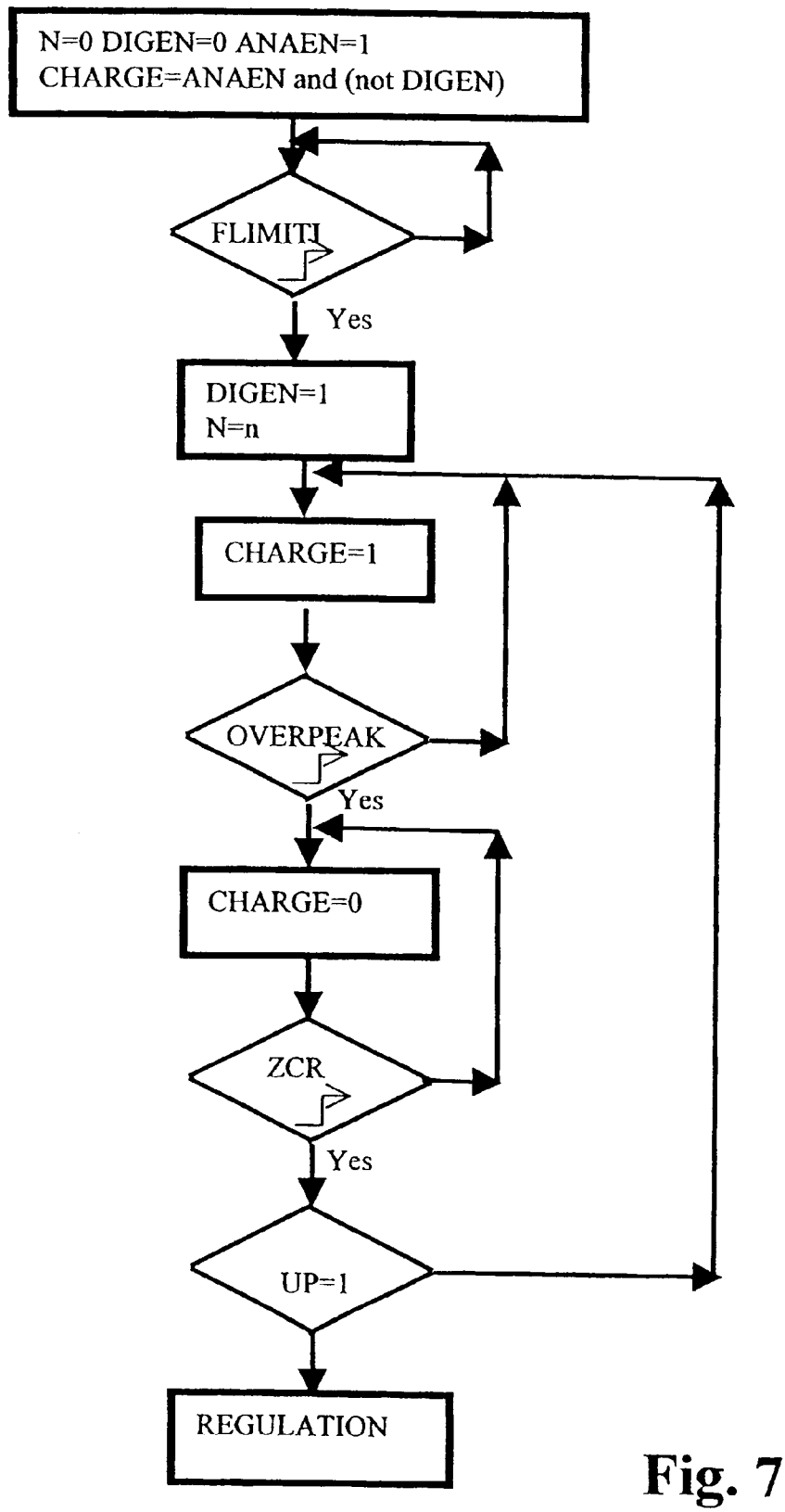
FIG. 7 is a flow chart of the start-up algorithm for the CFM method in accordance with the present invention.

A PCV mode start-up algorithm is illustrated in the flow chart of FIG. 3, and a CFM mode start-up algorithm is illustrated in FIG. 7. Both carry out the operations necessary to properly enable the analog portions of the control system and to ensure that critical components, e.g., comparators, reach steady state operation conditions and a correct bias before beginning the regulation algorithm.

At start-up, the asynchronous finite state machine runs the start up algorithm which is substantially identical for either the PVC method (FIG. 3) or the CFM method (FIG. 7). The finite state machine substantially waits for a predetermined delay from the power-up instant before forcing a first charge period.

Referring now to FIG. 3, the asynchronous machine enables the analog portion of the converter and sets the signal HCEN=1. This enables the linear ramp voltage generator and couples the output of the CURRENT READER from the input of the comparator OVERPEAK. The asynchronous machine waits for the output of the comparator OVERPEAK to switch from low to high.

At the transition of the signal OVERPEAK, the analog components (voltage comparators) are in a steady state and are correctly biased. An alternative way of generating the initial delay to allow for a correct biasing of the components of the converter is illustrated in FIG. 7. Referring to the CFM method, the delay is produced by the comparator FLIMITI of FIG. 8, which switches after a pre-established time.

Figure 4:
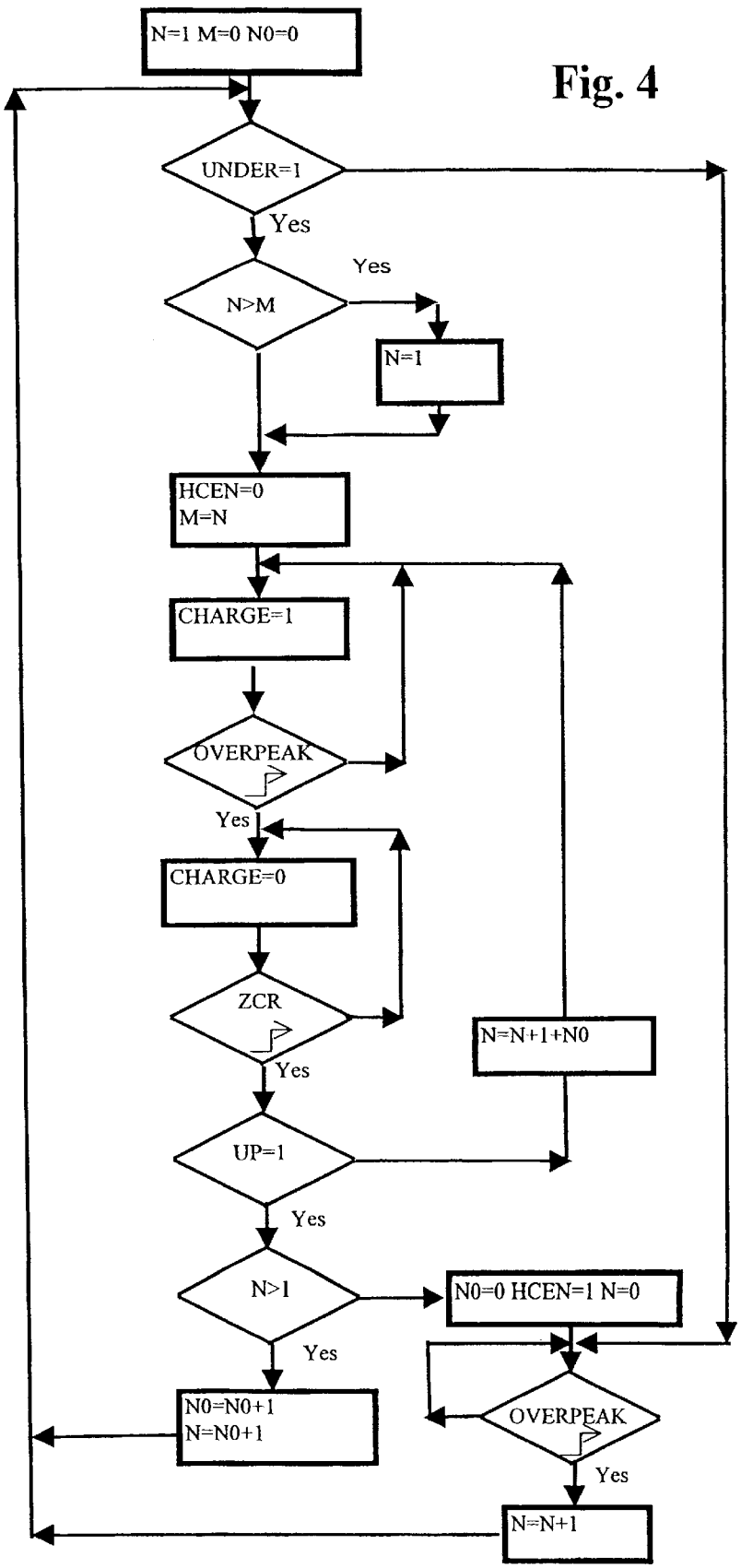
FIG. 4 is a flow chart of the regulation algorithm executed by the digital state machine in accordance with the present invention.

At the end of the initial delay, the finite state asynchronous digital machine enables the power drivers (DIGEN=1), establishes the peak value of the current and commands the charge/discharge phases until the output voltage reaches the desired level (UP=1). Once such a level has been attained, the regulation algorithm of the invention, which has been previously described and which is schematically illustrated by the flow chart of FIG. 4 for the PCV embodiment and in FIG. 9 for the CFM embodiment, is implemented.

Figure 5:
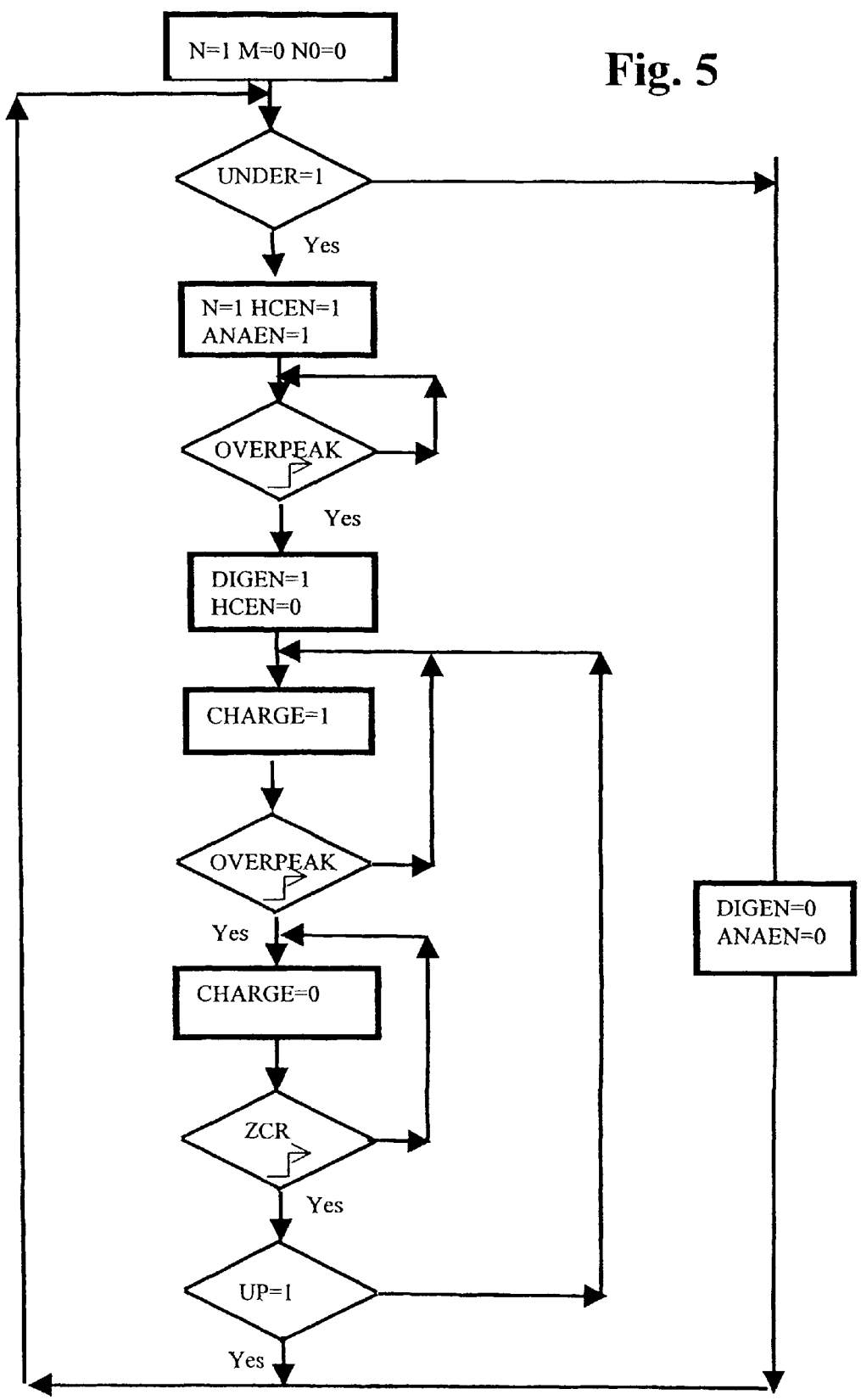
FIG. 5 is a flow chart of the algorithm for a low power consumption (LPC) mode that activates the drivers of the analog portions of the control system, which are executed by the digital state machine in accordance with the present invention.

The low power consumption (LPC) algorithm, illustrated in the flow chart of FIG. 5, has the function of enabling/disabling the drivers and the analog components, thus allowing a further energy saving. When the LPC signal is high and the finite state machine is executing the regulation algorithm, the output voltage is declining toward the lower threshold of the hysteresis window (UNDER=1). The power drivers and the analog components are disabled, except the comparator UNDER.

When the voltage reaches the low threshold, the finite state machine enables again the analog components and sets the signal HCEN=1. The comparator OVERPEAK thus compares the current in the upper side switch N1 with a pre-established value provided by the DAC2 coupled to the comparator. Similar to what happens during the start-up algorithm, the leading edge of OVERPEAK signal confirms that the analog components are in a steady state. It is possible to enable the drivers (DIGEN=1) and to start the regulation algorithm.

An example of a circuit implementing the CFM version of the method of the invention is depicted in FIG. 8. It differs from the circuit of FIG. 2 because it uses a signal SYNCRO, which indicates a condition of a minimum load which makes the converter non-synchronous (SYNCRO=1). A signal OVER indicates a condition of over-elongation of the output (OVER=1). Furthermore, a comparator FLIMITI has the function of establishing a maximum time interval during which pulses must be produced.

The comparator FLIMITI is present because in some applications it may be necessary to limit to a given minimum value the switching frequency so that circuits coupled with the DC-DC converter avoid undesired interferences. In audio applications for example, it is useful to ensure that the switching frequency do not decrease below about 20 kHz to prevent interference problems.

To ensure this, the method of the invention may be modified to force a charge period even if the output voltage has not attained the upper threshold of the hysteresis window. A charge period may be forced whenever the time interval between two consecutive phases exceeds a certain pre-established time, e.g., 40 microseconds which is equivalent to a switching frequency of 25 kHz.

Such a modification can be conveniently implemented both with the circuit of FIG. 8, which has the signal FLIMITI, and with the finite state asynchronous machine of FIG. 2. Such a result can be obtained having the machine of FIG. 2 count the number of OVERPEAK rising edges, compare such a number with a pre-established value Nmax and eventually command a turn-on and turn-off phase. This is done even if the output voltage has not yet attained the minimum allowed level when such a number exceeds the pre-established number Nmax.

Given that the rising edges of the OVERPEAK signal are regularly spaced in time, establishing a maximum number Nmax is clearly equivalent to establishing a maximum time interval that can elapse between two consecutive pulses, i.e., the minimum frequency of the pulses is inversely proportional to Nmax. The CFM embodiment, complete with functions implementing the above noted frequency control depicted within the dash-line perimeter, is depicted in FIG. 9.

After the start-up algorithm, the circuit of FIG. 8 verifies the elapsing of a time of at least 40 microseconds. If so, then this event is stored by way of a flag (1 FLIMITION=1) and it is verified whether the upper threshold of the hysteresis window has been reached (UP=1). In the negative case, there is no over-elongation (OVER=0) and the usual method of delivering current pulses to the load is carried out.

Upon reaching the condition of UP=1, the system checks if there is a condition of minimum load permitting a synchronous rectification of the converter by verifying that N=0 and FLIMITION=1. If the load is sufficiently low the system will deliver current pulses of minimum amplitude (N=0) and at the allowed maximum time interval of 40 milliseconds (FLIMITION=1). Therefore, it will be necessary to signal external the system such a condition (SYNCRO=0).

If at a restart of a driving cycle the output voltage is not below the lower threshold of the hysteresis window in the established maximum time (FLIMITI=1) and exceeds the upper threshold of the hysteresis window (UP=1), the system signals (OVER=1) that there is an over-elongation of the output voltage, i.e., the load is being driven at a voltage in excess of the upper threshold of the pre-established hysteresis window.

That which is claimed is:

1. A method for controlling a DC-DC converter comprising:
   comparing an output voltage of the DC-DC converter with a low threshold and a high threshold;
   beginning a charge period for an inductor of the DC-DC converter each time the output voltage drops below the low threshold;
   progressively increasing the charge transferred to the inductor during the charge period until the output voltage rises to the high threshold;
   measuring and storing a new time interval between two consecutive charge periods;
   comparing the new time interval with a previously detected and stored time interval; and
   decreasing a next charge period to correspond to a minimum charge when an increase of the new time interval between two consecutive charge periods is detected.

2. A method according to claim 1, wherein the charge being transferred is based upon a single current pulse having a pre-established duration and amplitude.

3. A method according to claim 1, wherein the charge being transferred is based upon a series of current pulses having pre-established durations and amplitudes.

4. A method according to claim 1, further comprising comparing the new time interval with a maximum value; and wherein beginning the charge period comprises beginning with the minimum charge even if the output voltage has not yet attained the low threshold.

5. A method according to claim 1, wherein the charge period corresponds to an on interval of at least one power switch.

6. A method according to claim 1, wherein the at least one power switch comprises a MOS transistor.

7. A method for controlling a DC-DC converter comprising:
   comparing an output voltage of the DC-DC converter with a low threshold and a high threshold;
   beginning a charge period for an inductor of the DC-DC converter each time the output voltage drops below the low threshold;
   progressively increasing the charge transferred to the inductor during the charge period until the output voltage rises to the high threshold;

measuring and storing a new time interval between two consecutive charge periods;

comparing the new time interval with a previously detected and stored time interval; and decreasing a next charge period to correspond to a minimum charge when an increase of the new time interval between two consecutive charge periods is detected, the charge being transferred during the charge period is based upon at least one current pulse having a pre-established duration and amplitude.

8. A method according to claim 7, wherein the at least one current pulse comprises a single current pulse having a pre-established duration and amplitude.

9. A method according to claim 7, wherein the at least one current pulse comprises a series of current pulses having pre-established durations and amplitudes.

10. A method according to claim 7, wherein the output voltage starts from the low threshold upon executing beginning of the charge period when the charge transferred to the inductor is progressively increased during the charge period.

11. A method according to claim 7, further comprising comparing the new time interval with a maximum value; and wherein beginning of the charge period comprises beginning with the minimum charge even if the output voltage has not yet attained the low threshold.

12. A method according to claim 7, wherein the charge period corresponds to an on interval of at least one power switch.

13. A method according to claim 12, wherein the at least one power switch comprises a MOS transistor.

14. A DC-DC converter comprising:
  at least one power switch for transferring a charge from a supply node to an inductor connected to the output of the DC-DC converter;
  a controller comprising a start-up algorithm and a low power consumption algorithm, said controller for controlling said at least one power switch for charging said inductor by running the start-up algorithm and the low power consumption algorithm;
  a first digital/analog converter having an input connected to said controller for receiving digital data, and an output for providing a high threshold and a low threshold;
  a first comparator and a second comparator each having a first input for receiving an output voltage of the DC-DC converter, said first comparator having a second input for receiving the high threshold and said second comparator having a second input for receiving the low threshold, said first and second comparators having respective outputs connected to respective inputs of said controller;
  a second digital/analog converter having an input connected to said controller for receiving a digital value therefrom; and
  a third comparator connected to said second digital/analog converter for comparing a reference voltage corresponding to the digital value with either a linear voltage ramp having a pre-established slope or a voltage value proportional to the current charging said inductor through said at least one power switch.

15. A DC-DC converter according to claim 14, wherein said third comparator compares either the linear voltage ramp or the voltage value proportional to the current charging said inductor based upon a signal produced by said controller.

16. A DC-DC converter according to claim 14, further comprising a fourth comparator connected to said inductor for detecting a null value of current flowing therethrough for charging said inductor.

17. A DC-DC converter according to claim 14, further comprising a monitoring circuit having an input connected to said at least one power switch for monitoring current flowing therethrough for charging said inductor, and an output connected to an input of said third comparator for providing the voltage value proportional to the current charging said inductor through said at least one power switch.

18. A DC-DC converter according to claim 14, wherein said controller executes beginning of a charge period each time the output voltage drops below the low threshold, and progressively increases the charge transferred to said inductor during the charge period until the output voltage rises to the high threshold.

19. A DC-DC converter according to claim 14, wherein said controller uses respective logic commands for charging and not charging said inductor.

20. A DC-DC converter according to claim 14, wherein said controller stores duration of a new time interval between two consecutive charge periods, and compares the new time interval with a previously detected and stored time interval.

21. A DC-DC converter according to claim 20, wherein said controller decreases duration of a next charge period to correspond to a minimum charge when an increase of the new time interval between two consecutive charge periods is detected.

22. A DC-DC converter according to claim 18, wherein the charge being transferred during the charge period is based upon a single current pulse having a pre-established duration and amplitude.

23. A DC-DC converter according to claim 18, wherein the charge being transferred during the charge period is based upon a series of current pulses having preestablished durations and amplitudes.

24. A DC-DC converter according to claim 14, wherein said at least one power switch comprises a MOS transistor.

25. A DC-DC converter comprising:
  a first comparison circuit connected to an output of the DC-DC converter for comparing an output voltage with a low threshold and a high threshold;
  at least one power switch for transferring a charge from a supply node to a load connected to the output of the DC-DC converter via an inductor;
  a controller connected to said at least one power switch for beginning a charge period for the inductor each time the output voltage drops below the low threshold, said controller progressively increasing the charge transferred to the inductor during the charge period until the output voltage rises to the high threshold;
  a monitoring circuit for measuring and storing a new time interval between two consecutive charge periods; and
  a second comparison circuit connected to said monitoring circuit for comparing the new time interval with a previously detected and stored time interval;
  said controller decreasing a next charge period to correspond to a minimum charge when an increase of the new time interval between two consecutive charge periods is detected.

26. A DC-DC converter according to claim 25, wherein the charge being transferred during the charge period is based upon a single current pulse having a pre-established duration and amplitude.

27. A DC-DC converter according to claim 25, wherein the charge being transferred during the charge period is based upon a series of current pulses having preestablished durations and amplitudes.

28. A DC-DC converter according to claim 25, wherein the charge period corresponds to duration of said at least one power switch.

29. A DC-DC converter according to claim 28, wherein said at least one power switch comprises a MOS transistor.

30. A DC-DC converter according to claim 25, wherein said first comparison circuit comprises a first comparator and a second comparator each having a first input for receiving the output voltage of the DC-DC converter, said first comparator having a second input for receiving the high threshold and said second comparator having a second input for receiving the low threshold, said first and second comparators having respective outputs connected to respective inputs of said controller.

31. A DC-DC converter according to claim 25, wherein said controller comprises a start-up algorithm and a low power consumption algorithm, said controller for controlling said at least one power switch for charging said inductor by running the start-up algorithm and the low power consumption algorithm.

32. A DC-DC converter according to claim 25, further comprising a first digital/analog converter having an input connected to said controller for receiving digital data, and an output for providing the high threshold and the low threshold to said first comparison circuit.

33. A DC-DC converter according to claim 25, further comprising:
- a second digital/analog converter having an input connected to said controller for receiving a digital value therefrom; and
- a third comparison circuit connected to said second digital/analog converter for comparing a reference voltage corresponding to the digital value with either a linear voltage ramp having a pre-established slope or a voltage value proportional to the current charging the inductor through said at least one power switch.

\* \* \* \* \*